US008841876B2

(12) United States Patent
Leaver et al.

(10) Patent No.: US 8,841,876 B2
(45) Date of Patent: Sep. 23, 2014

(54) CONTROL OF AN ELECTRICAL MACHINE

(75) Inventors: Mark Edward Leaver, Malmesbury (GB); Yu Chen, Malmesbury (GB); Tuncay Celik, Malmesbury (GB)

(73) Assignee: Dyson Technology Limited, Malmesbury (GB)

( * ) Notice: Subject to any disclaimer, the term of this patent is extended or adjusted under 35 U.S.C. 154(b) by 258 days.

(21) Appl. No.: 13/250,302

(22) Filed: Sep. 30, 2011

(65) Prior Publication Data

US 2012/0081064 A1   Apr. 5, 2012

(30) Foreign Application Priority Data

Oct. 4, 2010 (GB) .................................. 1016687.4

(51) Int. Cl.
H02P 1/46 (2006.01)
H02P 6/00 (2006.01)
H02P 6/14 (2006.01)
H02P 23/00 (2006.01)

(52) U.S. Cl.
CPC ............ *H02P 23/0081* (2013.01); *H02P 6/008* (2013.01); *H02P 6/142* (2013.01)
USPC ............................ 318/721; 318/701; 318/807

(58) Field of Classification Search
USPC .................. 318/721, 701, 807, 432, 400.12, 318/400.04, 772, 400.01, 801, 400.13
See application file for complete search history.

(56) References Cited

U.S. PATENT DOCUMENTS

| 3,737,748 A | 6/1973 | Teders |
|---|---|---|
| 3,781,620 A | 12/1973 | Toth |
| 3,809,984 A | 5/1974 | Hoge |
| 3,908,158 A | 9/1975 | Studtmann |
| 4,039,913 A | 8/1977 | Clegg |
| 4,250,435 A | 2/1981 | Alley et al. |
| 4,266,177 A | 5/1981 | Nola |
| 4,323,835 A | 4/1982 | Lee |
| 4,413,217 A | 11/1983 | Green et al. |
| 4,465,957 A | 8/1984 | Crockett |
| 4,486,700 A | 12/1984 | Kawate et al. |
| 4,556,827 A | 12/1985 | Erdman |
| 4,558,264 A | 12/1985 | Weischedel |
| 4,746,844 A | 5/1988 | MacKelvie et al. |
| 4,791,341 A | 12/1988 | Brown et al. |

(Continued)

FOREIGN PATENT DOCUMENTS

| EP | 0 613 234 | 8/1994 |
|---|---|---|
| EP | 1 209 805 | 5/2002 |

(Continued)

OTHER PUBLICATIONS

Clothier et al., U.S. Office Action mailed Feb. 3, 2012, directed to U.S. Appl. No. 13/081,290; 8 pages.
International Search Report and Written Opinion mailed Feb. 8, 2013, directed to International Application No. PCT/GB2011/051781; 8 pages.

(Continued)

*Primary Examiner* — Karen Masih
(74) *Attorney, Agent, or Firm* — Morrison & Foerster LLP

(57) ABSTRACT

A method of controlling an electrical machine that includes exciting a phase winding with a supply voltage, and freewheeling the phase winding when current in the phase winding exceeds a threshold. The threshold is then adjusted in response to changes in the supply voltage and/or the speed of the electrical machine. Additionally, a control system that implements the method and an electrical machine comprising the control system are described.

19 Claims, 8 Drawing Sheets

(56) References Cited

U.S. PATENT DOCUMENTS

| | | | |
|---|---|---|---|
| 4,875,148 A | 10/1989 | Roe et al. |
| 5,008,608 A | 4/1991 | Unsworth et al. |
| 5,055,751 A | 10/1991 | MacKelvie |
| 5,156,005 A | 10/1992 | Redlich |
| 5,187,419 A | 2/1993 | DeLange |
| 5,334,922 A | 8/1994 | Manini |
| 5,420,492 A | 5/1995 | Sood et al. |
| 5,448,141 A | 9/1995 | Kelley et al. |
| 5,457,375 A | 10/1995 | Marcinkiewicz et al. |
| 5,552,683 A | 9/1996 | Dargent |
| 5,577,235 A | 11/1996 | Mitra |
| 5,581,169 A | 12/1996 | Kerkman et al. |
| 5,652,493 A | 7/1997 | Hendershot, Jr. |
| 5,652,494 A | 7/1997 | Sugden |
| 5,675,231 A | 10/1997 | Becerra et al. |
| 5,739,652 A | 4/1998 | Sriram |
| 5,783,917 A | 7/1998 | Takekawa |
| 5,831,809 A * | 11/1998 | Schmitz et al. | 361/154 |
| 5,929,577 A | 7/1999 | Neidorff et al. |
| 5,986,417 A | 11/1999 | Nicolai et al. |
| 6,087,654 A | 7/2000 | Durham, III |
| 6,181,583 B1 | 1/2001 | Okui et al. |
| 6,194,852 B1 | 2/2001 | Lovatt et al. |
| 6,198,238 B1 | 3/2001 | Edelson |
| 6,208,113 B1 | 3/2001 | Lelkes et al. |
| 6,221,291 B1 | 4/2001 | Van Ert et al. |
| 6,236,179 B1 | 5/2001 | Lawler et al. |
| 6,263,450 B1 | 7/2001 | Predko |
| 6,320,275 B1 | 11/2001 | Okamoto et al. |
| 6,323,609 B1 | 11/2001 | Lopez |
| 6,621,291 B2 | 9/2003 | Lee et al. |
| 6,803,741 B2 | 10/2004 | Messersmith |
| 6,847,186 B1 | 1/2005 | Kerlin |
| 6,885,161 B2 | 4/2005 | de Nanclares et al. |
| 6,901,212 B2 | 5/2005 | Masino |
| 6,906,503 B2 | 6/2005 | Lopez-Santillana et al. |
| 7,030,582 B2 | 4/2006 | Masino |
| 7,034,498 B2 | 4/2006 | Kerlin |
| 7,042,183 B2 | 5/2006 | Fitzgibbon et al. |
| 7,049,774 B2 | 5/2006 | Chin et al. |
| 7,079,758 B2 | 7/2006 | Sunaga et al. |
| 7,102,303 B2 | 9/2006 | Brotto |
| 7,141,949 B2 | 11/2006 | Harwood |
| 7,239,098 B2 | 7/2007 | Masino |
| 7,436,145 B2 | 10/2008 | Gauthier et al. |
| 7,459,878 B2 | 12/2008 | Wang et al. |
| 7,477,034 B2 | 1/2009 | MacKay |
| 7,489,094 B2 | 2/2009 | Steiner et al. |
| 7,567,047 B2 | 7/2009 | Rozman |
| 7,589,486 B2 | 9/2009 | Yamada et al. |
| 7,646,155 B2 | 1/2010 | Woods et al. |
| 7,671,549 B2 | 3/2010 | Steiner et al. |
| 7,688,018 B2 | 3/2010 | Goto et al. |
| 7,692,395 B2 | 4/2010 | Brown |
| 7,714,529 B2 | 5/2010 | Chen et al. |
| 7,750,595 B2 | 7/2010 | Yamada et al. |
| 7,834,566 B2 | 11/2010 | Woods et al. |
| 7,894,216 B2 | 2/2011 | Melanson |
| 7,928,673 B2 | 4/2011 | Woods et al. |
| 8,018,184 B2 | 9/2011 | Takeuchi |
| 8,044,623 B2 | 10/2011 | Takeuchi et al. |
| 8,093,858 B1 | 1/2012 | Kadah et al. |
| 8,094,472 B2 | 1/2012 | Chang et al. |
| 8,098,035 B2 | 1/2012 | Sekimoto et al. |
| 8,476,852 B2 | 7/2013 | Hawker et al. |
| 2001/0011879 A1 | 8/2001 | Erdman |
| 2002/0171388 A1 | 11/2002 | Seki |
| 2002/0185986 A1 | 12/2002 | Seki |
| 2003/0034793 A1 | 2/2003 | Lee et al. |
| 2003/0052632 A1 | 3/2003 | Wissmach et al. |
| 2003/0053323 A1 | 3/2003 | Kimura et al. |
| 2003/0201739 A1 | 10/2003 | Horng et al. |
| 2003/0230999 A1 | 12/2003 | de Nanclares et al. |
| 2003/0231875 A1 | 12/2003 | Masino |
| 2004/0027085 A1 | 2/2004 | Berroth et al. |
| 2004/0047166 A1 | 3/2004 | Lopez-Santillana et al. |
| 2004/0051494 A1 | 3/2004 | Messersmith |
| 2004/0070356 A1 | 4/2004 | Masino |
| 2004/0131342 A1 | 7/2004 | Masino |
| 2004/0217721 A1 | 11/2004 | Brotto |
| 2004/0227486 A1 | 11/2004 | Kerlin |
| 2005/0099148 A1 | 5/2005 | DuLaney |
| 2005/0189891 A1 | 9/2005 | Kurosawa et al. |
| 2005/0225275 A1 | 10/2005 | Eskritt et al. |
| 2005/0237011 A1 | 10/2005 | Woods et al. |
| 2005/0248306 A1 | 11/2005 | Chen et al. |
| 2006/0273751 A1 | 12/2006 | DeJonge et al. |
| 2007/0103840 A1 | 5/2007 | Asada et al. |
| 2007/0114963 A1 | 5/2007 | Steiner et al. |
| 2007/0126380 A1 | 6/2007 | Beifus |
| 2007/0241703 A1 | 10/2007 | Yamada et al. |
| 2008/0030182 A1 * | 2/2008 | Sutardja et al. | 323/283 |
| 2008/0034532 A1 | 2/2008 | Yang |
| 2008/0150460 A1 | 6/2008 | Rosskamp |
| 2008/0180049 A1 | 7/2008 | Yang |
| 2008/0200702 A1 | 8/2008 | Gurumurthy et al. |
| 2008/0211450 A1 | 9/2008 | Yamada et al. |
| 2008/0272721 A1 | 11/2008 | Mayes et al. |
| 2008/0273360 A1 | 11/2008 | Goto |
| 2008/0290761 A1 | 11/2008 | Eckert et al. |
| 2009/0072775 A1 | 3/2009 | Steiner et al. |
| 2009/0174350 A1 | 7/2009 | Kuroda et al. |
| 2009/0251086 A1 | 10/2009 | Sekimoto et al. |
| 2009/0302682 A1 | 12/2009 | Hammond et al. |
| 2010/0065293 A1 | 3/2010 | Lohr |
| 2010/0079097 A1 | 4/2010 | Woods et al. |
| 2010/0079098 A1 | 4/2010 | Woods et al. |
| 2010/0109597 A1 | 5/2010 | Steiner et al. |
| 2010/0237813 A1 | 9/2010 | Seki et al. |
| 2010/0244757 A1 | 9/2010 | Tsai et al. |
| 2010/0249757 A1 | 9/2010 | Chen |
| 2010/0251509 A1 | 10/2010 | Clothier |
| 2010/0251511 A1 | 10/2010 | Clothier et al. |
| 2010/0251512 A1 | 10/2010 | Clothier et al. |
| 2010/0253250 A1 | 10/2010 | Marvelly et al. |
| 2010/0253257 A1 | 10/2010 | Clothier et al. |
| 2010/0253258 A1 | 10/2010 | Fabis et al. |
| 2010/0253261 A1 | 10/2010 | Dawe et al. |
| 2010/0253262 A1 | 10/2010 | Celik |
| 2010/0253263 A1 | 10/2010 | Clothier et al. |
| 2010/0253264 A1 | 10/2010 | Clothier et al. |
| 2010/0253265 A1 | 10/2010 | Clothier et al. |
| 2010/0253274 A1 | 10/2010 | Clothier et al. |
| 2010/0254685 A1 | 10/2010 | Dai |
| 2010/0256782 A1 | 10/2010 | Dai |
| 2010/0259206 A1 | 10/2010 | Joachimsmeyer |
| 2010/0295490 A1 | 11/2010 | Kuroshima et al. |
| 2010/0295516 A1 | 11/2010 | Matt et al. |
| 2010/0320956 A1 | 12/2010 | Lumsden et al. |
| 2011/0057601 A1 | 3/2011 | Hiltbold |
| 2011/0058288 A1 | 3/2011 | Vanko et al. |
| 2011/0080130 A1 | 4/2011 | Venkataraman |
| 2011/0234134 A1 | 9/2011 | Ramu |
| 2011/0254476 A1 * | 10/2011 | Clothier et al. | 318/400.1 |
| 2011/0254480 A1 | 10/2011 | Chen et al. |
| 2011/0254481 A1 | 10/2011 | Chen et al. |
| 2011/0254482 A1 | 10/2011 | Dai |
| 2011/0254483 A1 | 10/2011 | Chen et al. |
| 2011/0254484 A1 | 10/2011 | Dai |
| 2011/0254485 A1 | 10/2011 | Clothier et al. |
| 2011/0254486 A1 | 10/2011 | Celik |
| 2011/0254487 A1 | 10/2011 | Clothier et al. |
| 2011/0254488 A1 | 10/2011 | Clothier et al. |
| 2011/0254489 A1 | 10/2011 | Greetham |
| 2011/0257791 A1 | 10/2011 | Hawker et al. |
| 2013/0038360 A1 | 2/2013 | Takahashi |

FOREIGN PATENT DOCUMENTS

| | | |
|---|---|---|
| EP | 1 473 823 | 11/2004 |
| EP | 1 786 093 | 5/2007 |
| EP | 1 816 739 | 8/2007 |
| EP | 1 837 986 | 9/2007 |
| EP | 2 151 917 | 2/2010 |

(56) References Cited

FOREIGN PATENT DOCUMENTS

| | | |
|---|---|---|
| GB | 2 305 033 | 3/1997 |
| GB | 2 380 873 | 4/2003 |
| GB | 2 410 847 | 8/2005 |
| GB | 2469132 | 10/2010 |
| JP | 59-63983 | 4/1984 |
| JP | 62-18986 | 1/1987 |
| JP | 7-284289 | 10/1995 |
| JP | 8-172789 | 7/1996 |
| JP | 8-214585 | 8/1996 |
| JP | 9-93977 | 4/1997 |
| JP | 9-117183 | 5/1997 |
| JP | 9-140185 | 5/1997 |
| JP | 9-294389 | 11/1997 |
| JP | 10-155299 | 6/1998 |
| JP | 10-191679 | 7/1998 |
| JP | 11-223558 | 8/1999 |
| JP | 11-285285 | 10/1999 |
| JP | 2000-308385 | 11/2000 |
| JP | 2001-231287 | 8/2001 |
| JP | 2002-51589 | 2/2002 |
| JP | 2007-110779 | 4/2007 |
| JP | 2007-520988 | 7/2007 |
| JP | 2008-161048 | 7/2008 |
| JP | 2008-188264 | 8/2008 |
| JP | 2008-189225 | 8/2008 |
| JP | 2009-219282 | 9/2009 |
| JP | 2010-246387 | 10/2010 |
| WO | WO-96/01521 | 1/1996 |
| WO | WO-97/08818 | 3/1997 |
| WO | WO-01/80414 | 10/2001 |
| WO | WO-2005/008878 | 1/2005 |

OTHER PUBLICATIONS

Clothier et al., U.S. Office Action mailed Mar. 12, 2013, directed to U.S. Appl. No. 13/081,290; 16 pages.
Celik, T., U.S. Office Action mailed Apr. 23, 2013, directed to U.S. Appl. No. 13/082,166; 11 pages.
Clothier et al., U.S. Office Action mailed Apr. 25, 2013, directed to U.S. Appl. No. 13/087,109; 9 pages.
GB Search Report dated Feb. 16, 2011, directed to counterpart GB Application No. 1016687.4; 2 pages.
Atmel Corporation, (2005) "AVR440: Sensorless Control of Two-Phase Brushless DC Motor," *8-bit AVR® Microcontrollers, AVR440 Application Note*; 16 pages.
Atmel Corporation, (2006) "AVR443: Sensor-based Control of Three Phase Brushless DC Motor," 8-bit AVR® Microcontrollers, *AVR443 Application Note*; 7 pages.
Atmel Corporation, (2011) "8-bit AVR® with 8KBytes In-System Programmable Flash," *ATmega8L Datasheet*: pp. 69-120.
Clothier et al., U.S. Office Action mailed Aug. 23, 2012, directed to U.S. Appl. No. 13/081,290; 11 pages.
Clothier et al., U.S. Office Action mailed Jan. 8, 2014, directed to U.S. Appl. No. 13/085,155; 15 pages.
Clothier et al., U.S. Office Action mailed Nov. 7, 2013, directed to U.S. Appl. No. 13/087,109; 8 pages.
Chen et al., U.S. Office Action mailed Aug. 29, 2013, directed to U.S. Appl. No. 13/083,251; 14 pages.
Chen et al., U.S. Office Action mailed Aug. 19, 2013, directed to U.S. Appl. No. 13/086,175; 11 pages.
Dai, U.S. Office Action mailed Jan. 30, 2014, directed to U.S. Appl. No. 13/086;174; 18 pages.
Chen et al., U.S. Office Action mailed Mar. 28, 2014, directed to U.S. Appl. No. 13/083,251; 14 pages.

* cited by examiner

| Control signals | | | Power switches | | | | Inverter Condition |
|---|---|---|---|---|---|---|---|
| DIR1 | DIR2 | FW# | Q1 | Q2 | Q3 | Q4 | |
| 0 | 0 | X | 0 | 0 | 0 | 0 | Off |
| 1 | 0 | 1 | 1 | 0 | 0 | 1 | Drive Left-to-Right |
| 0 | 1 | 1 | 0 | 1 | 1 | 0 | Drive Right-to-Left |
| 1 | 0 | 0 | 0 | 0 | 0 | 1 | Freewheel Left-to-Right |
| 0 | 1 | 0 | 0 | 0 | 1 | 0 | Freewheel Right-to-Left |
| 1 | 1 | X | - | - | - | - | Illegal |

CONTROL OF AN ELECTRICAL MACHINE

REFERENCE TO RELATED APPLICATIONS

This application claims the priority of United Kingdom Application No. 1016687.4, filed Oct. 4, 2010, the entire contents of which are incorporated herein by reference.

FIELD OF THE INVENTION

The present invention relates to control of an electrical machine.

BACKGROUND OF THE INVENTION

An electrical machine is typically driven by a control system that controls the excitation of phase windings. The control system may adjust the turn-on and turn-off angles of excitation in response to changes in the speed of the electrical machine so as to maximize output power or minimize torque ripple. However, little attention is generally given to the efficiency of the electrical machine.

SUMMARY OF THE INVENTION

In a first aspect, the present invention provides a method of controlling an electrical machine, the method comprising exciting a phase winding of the electrical machine with a supply voltage, sensing current in the phase winding, freewheeling the phase winding when current in the phase winding exceeds a threshold, and adjusting the threshold in response to changes in at least one of the supply voltage and the speed of the electrical machine.

By employing an overcurrent threshold that varies with the supply voltage and/or speed of the electrical machine, the efficiency of the electrical machine may be improved. In particular, the overcurrent threshold may be adjusted such that harmonics within the phase-current waveform are reduced. Additionally, by employing an overcurrent threshold that varies with supply voltage and/or speed, the starting torque of the electrical machine may be reduced. This then reduces the stresses placed on mechanical components of the electrical machine and thus the lifespan of the electrical machine may be prolonged.

The method may comprise increasing the threshold in response to at least one of a decrease in the supply voltage and an increase the speed of the electrical machine. The rate at which current rises in the phase winding depends on, among other things, the supply voltage. By increasing the overcurrent threshold in response to a decrease in the supply voltage, a particular acceleration profile and/or power profile may be maintained irrespective of changes in the supply voltage. By increasing the overcurrent threshold in response to an increase in speed, the torque of the electrical machine can be gradually increased during start-up. Additionally, for a permanent-magnet electrical machine, the back EMF induced in the phase winding increases with speed. By increasing the overcurrent threshold in response to an increase in speed, a particular power profile may be achieved over a range of different rotor speeds.

The phase winding may be freewheeled for a freewheel period, after which the phase winding is again excited. The freewheel period may be fixed over each electrical half-cycle. This then simplifies the control of the electrical machine. If required, the freewheel period may be adjusted at the end of each electrical half-cycle, e.g. in response to changes in supply voltage or speed. Alternatively, in order to further simplify the control, the freewheel period may be fixed over a particular speed range, e.g. during initial acceleration.

The method may comprise sequentially exciting and freewheeling the phase winding over a period defined between a turn-on angle and a turn-off angle for each electrical half-cycle. The method then comprises adjusting at least one of the turn-on angle and the turn-off angle in response to changes in the supply voltage and/or the speed of the electrical machine. By adjusting the overcurrent threshold, the turn-on angle and/or turn-off angle, a particular power profile may be achieved over a range of different voltages and/or speeds. In particular, constant input or output power may be achieved over the range of voltages and/or speeds. Moreover, the overcurrent threshold, the turn-on angle and/or turn-off angle may be adjusted such that the efficiency of the electrical machine is optimized over the power profile.

The method may comprise sequentially exciting and freewheeling the phase winding over a conduction period for each electrical half-cycle, and adjusting the length of the conduction period in response to changes in the supply voltage and/or the speed of the electrical machine. By adjusting both the overcurrent threshold and the length of the conduction period in response to changes in supply voltage and/or speed, improvements in the efficiency of the electrical machine are achievable over a range of voltages and/or speeds. Further improvements in the efficiency may be possible by additionally adjusting the point at which the phase winding is commutated. Accordingly, the method may further comprise commutating the phase winding relative to edges of a rotor-position signal, and adjusting the period between each commutation and each edge of the rotor-position signal in response to changes in the supply voltage and/or the speed of the electrical machine.

The method may comprise freewheeling the phase winding for a freewheel period, and adjusting the freewheel period in response to changes in the supply voltage and/or speed of the electrical machine. Accordingly, further improvements in the efficiency of the electrical machine may be realized.

The method may comprise generating a pulsed signal having a duty cycle, smoothing the pulsed signal to generate a threshold voltage, sensing the voltage across a component of the electrical machine, comparing the sensed voltage with the threshold voltage, freewheeling the phase winding when the sensed voltage exceeds the threshold voltage, and adjusting the duty cycle in response to changes in the supply voltage and/or the speed of the electrical machine. This then represents a relatively simple way in which to generate an overcurrent threshold that can be adjusted in response to changes in supply voltage and/or speed. In particular, the overcurrent threshold may be generated without the need for a digital-to-analog converter. Accordingly, a relatively simple and thus cheap circuit and/or or microcontroller may be used to implement the method.

The method may comprise storing a lookup table comprising a duty cycle for each of a plurality of voltages and/or speeds. The method then comprises selecting from the lookup table a duty cycle corresponding to the supply voltage and/or the speed of the electrical machine, and using the selected duty cycle to generate the pulsed signal. The use of a lookup table simplifies the control of the electrical machine. As a result, a relatively simple and thus cheap microcontroller may be used.

In a second aspect, the present invention provides a method of controlling an electrical machine, the method comprising sequentially exciting and freewheeling a phase winding of the electrical machine over each electrical half-cycle, the phase winding being excited with a supply voltage, the phase winding being freewheeled for a freewheel period when current in the phase winding exceeds a threshold, and the freewheel period being constant over each electrical half-cycle, and adjusting the threshold in response to changes in at least one of the supply voltage and the speed of the electrical machine.

In a third aspect, the present invention provides a method of controlling an electrical machine, the method comprising exciting a phase winding of the electrical machine with a supply voltage, generating a pulsed signal having a duty cycle, smoothing the pulsed signal to generate a threshold voltage, sensing the voltage across a component of the electrical machine, comparing the sensed voltage with the threshold voltage, freewheeling the phase winding when the sensed voltage exceeds the threshold voltage, and adjusting the duty cycle in response to changes in at least one of the supply voltage and the speed of the electrical machine.

In a fourth aspect, the present invention provides a control system for an electrical machine, the control system performing the method described in any one of the preceding paragraphs.

The control system preferably comprises an inverter coupled to the phase winding, a current sensor for sensing current in the phase winding, and a controller for generating one or more control signals for controlling the inverter. The inverter excites the phase winding with the supply voltage in response to first control signals from the controller, and freewheels the winding in response to second control signals from the controller. The controller then generates the first control signals and subsequently generates the second control signals when current in the phase winding exceeds the threshold.

The current sensor preferably outputs a signal having a voltage that is sensitive to current in the phase winding, and the control system comprises a threshold generator that generates a signal having a voltage that depends on at least one of the supply voltage and the speed of the electrical machine. The controller then generates the second control signals when the voltage of the signal output by the current sensor exceeds the voltage of the signal output by the threshold generator. More preferably, the threshold generator comprises a PWM module and a smoothing filter, and the duty cycle of the PWM module depends on at least one of the supply voltage and the speed of the electrical machine. The PWM module provides a cost-effective means for generating a signal having a voltage that can be adjusted (e.g., by means of the duty cycle) in response to changes in supply voltage and/or speed.

In a fifth aspect, the present invention provides a motor system comprising a permanent-magnet motor and a control system according to any one of the preceding paragraphs.

BRIEF DESCRIPTION OF THE DRAWINGS

In order that the present invention may be more readily understood, an embodiment of the invention will now be described, by way of example, with reference to the accompanying drawings, in which.

DETAILED DESCRIPTION OF THE INVENTION

Figure 1:
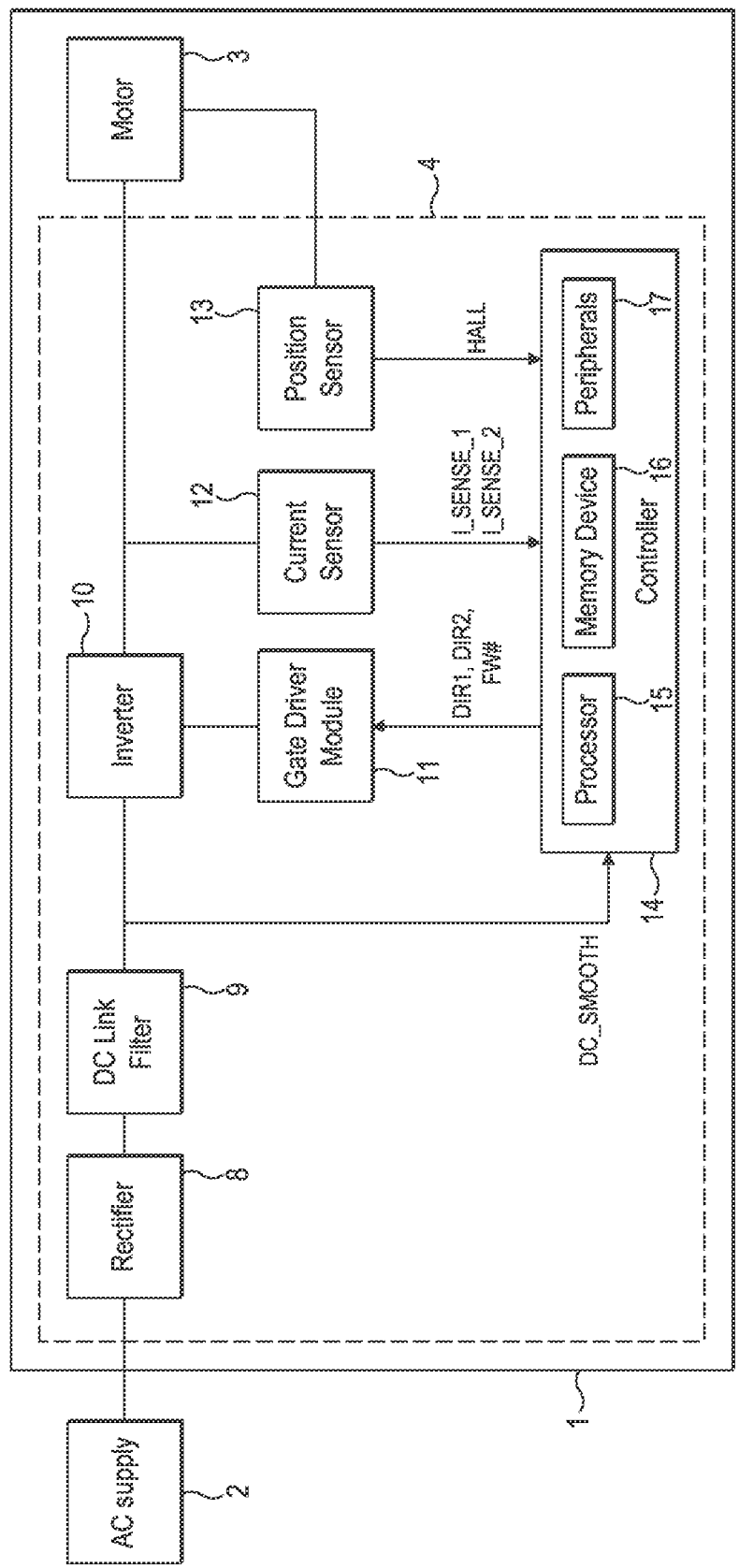
FIG. 1 is a block diagram of a motor system in accordance with the present invention.
Figure 2:
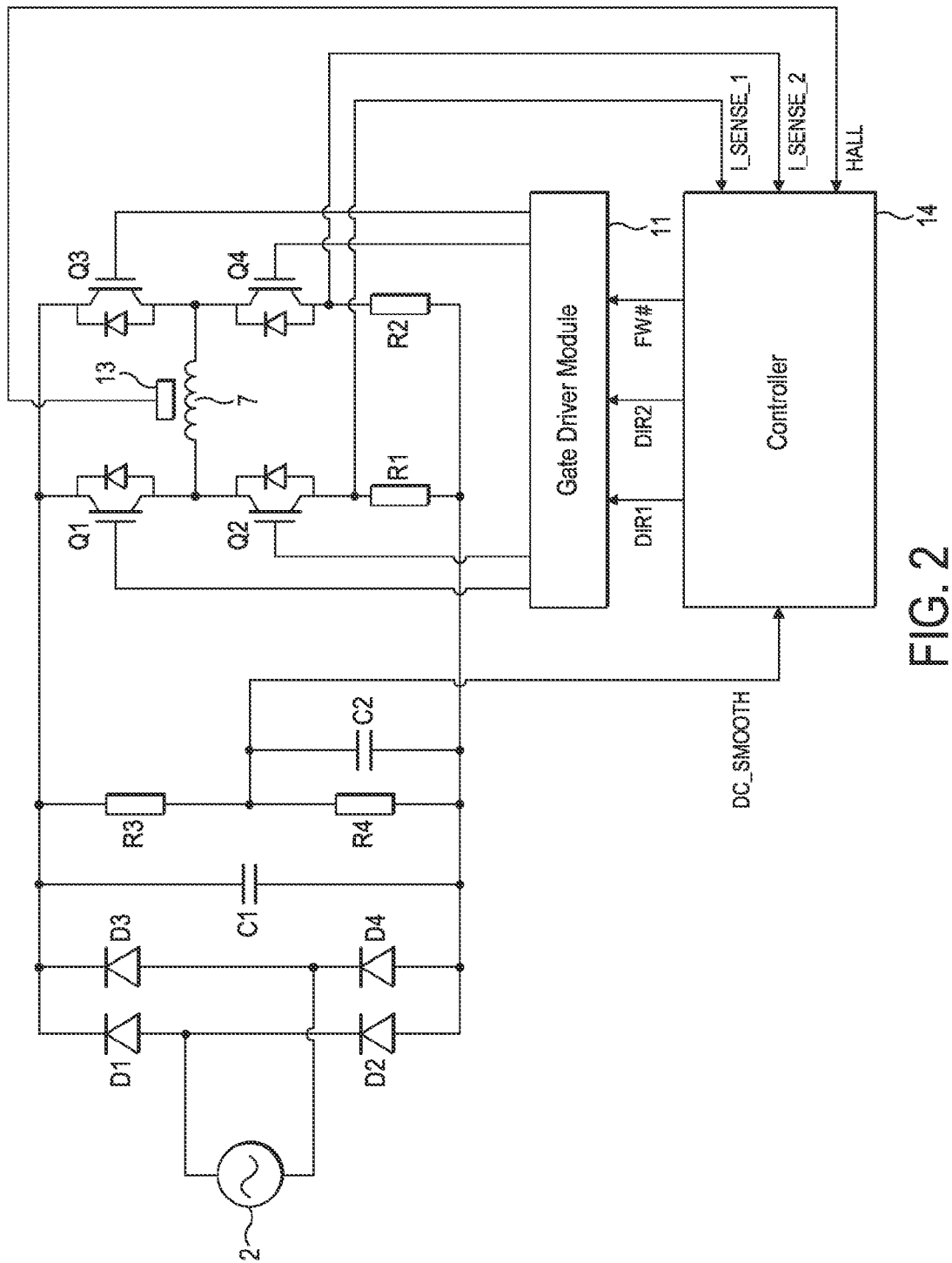
FIG. 2 is a schematic diagram of the motor system.
Figures 3, 4:
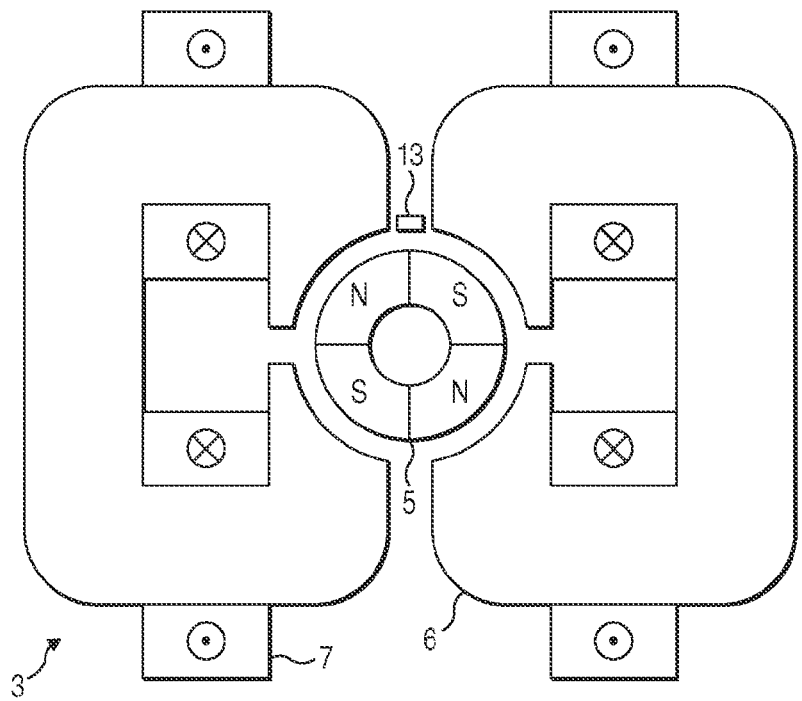
FIG. 3 is a sectional view of the motor of the motor system.
FIG. 4 details the allowed states of the inverter in response to control signals issued by the controller of the motor system.

The motor system 1 of FIGS. 1 to 3 is powered by an AC power supply 2 and comprises a brushless motor 3 and a control system 4.

The motor 3 comprises a four-pole permanent-magnet rotor 5 that rotates relative to a stator 6. The stator 6 comprises a pair of c-shaped cores that define four stator poles. Conductive wires are wound about the cores and are coupled together to form a single phase winding 7.

The control system 4 comprises a rectifier 8, a DC link filter 9, an inverter 10, a gate driver module 11, a current sensor 12, a rotor-position sensor 13, and a controller 14.

The rectifier 8 comprises a full-wave bridge of four diodes D1-D4 that rectify the output of the AC power supply 2 to provide a DC voltage.

The DC link filter 9 comprises a capacitor C1 that smoothes the relatively high-frequency ripple that arises from switching of the inverter 10. If required, the DC link filter 9 may additionally smooth the rectified DC voltage at the fundamental frequency.

The inverter 10 comprises a full bridge of four power switches Q1-Q4 that couple the DC link voltage to the phase winding 7. Each of the switches Q1-Q4 includes a freewheel diode, which protects the switch against voltage spikes that arise during inverter switching.

The gate driver module 11 drives the opening and closing of the switches Q1-Q4 in response to control signals received from the controller 14.

The current sensor 12 comprises a pair of shunt resistors R1,R2, each resistor located on a lower arm of the inverter 10. The voltage across each resistor R1,R2 is output to the controller 14 as a current sense signal, I_SENSE_1 and I_SENSE_2. The first current sense signal, I_SENSE_1, provides a measure of the current in the phase winding 7 when the inverter 10 is driven from right to left (as is described below in more detail). The second current sense signal, I_SENSE_2, provides a measure of the current in the phase winding 7 when the inverter 10 is driven from left to right. In locating the resistors R1,R2 on the lower arms of the inverter 10, current in the phase winding 7 continues to be sensed during freewheeling (again, as is described below in more detail).

The rotor-position sensor 13 comprises a Hall-effect sensor that outputs a digital signal, HALL, that is logically high or low depending on the direction of magnetic flux through the sensor 13. By locating the sensor 13 adjacent the rotor 5, the HALL signal provides a measure of the angular position of the rotor 5. More particularly, each edge of the HALL signal indicates a change in the polarity of the rotor 5. When rotating, the permanent-magnet rotor 5 induces a back EMF in the phase winding 7. Consequently, each edge of the HALL signal additionally represents a change in the polarity of the back EMF in the phase winding 7.

The controller 14 comprises a microcontroller having a processor 15, a memory device 16, a plurality of peripherals 17 (e.g. comparators, timers etc.), and a plurality of input/output pins 18. A suitable candidate is the PIC16F690 microcontroller by Microchip Technology Inc. The memory device 16 stores software instructions for execution by the processor 15. The memory device 16 also stores a plurality of lookup tables, which are indexed by the processor 15 during operation of the motor system 1.

The controller 14 is responsible for controlling the operation of the motor system 1. In response to four input signals: I_SENSE_1, I_SENSE_2, HALL, and DC_SMOOTH, the controller 14 generates and outputs three control signals: DIR1, DIR2, and FW#. The control signals are output to the gate driver module 11, which in response drives the opening and closing of the switches Q1-Q4 of the inverter 10.

I_SENSE_1 and I_SENSE_2 are the signals output by the current sensor 12, and HALL is the signal output by the rotor-position sensor 13. DC_SMOOTH is a smoothed measure of the DC link voltage, obtained by a potential divider R3,R4 and smoothing capacitor C2.

DIR1 and DIR2 control the direction of current through the inverter 10 and thus through the phase winding 7. When DIR1 is pulled logically high and DIR2 is pulled logically low, the gate driver module 11 closes switches Q1 and Q4, and opens switches Q2 and Q3, thus causing current to be driven through the phase winding 7 from left to right. Conversely, when DIR2 is pulled logically high and DIR1 is pulled logically low, the gate driver module 11 closes switches Q2 and Q3, and opens switches Q1 and Q4, thus causing current to be driven through the phase winding 7 from right to left. Current in the phase winding 7 is therefore commutated by reversing DIR1 and DIR2. If both DIR1 and DIR2 are pulled logically low, the gate drive module 11 opens all switches Q1-Q4.

FW# is used to disconnect the phase winding 7 from the DC link voltage and allow current in the phase winding 7 to freewheel around the low-side loop of the inverter 10. Accordingly, in response to a FW# signal that is pulled logically low, the gate driver module 11 causes both high-side switches Q1,Q2 to open. Current then freewheels around the low-side loop of the inverter 10 in a direction defined by DIR1 and DIR2.

FIG. 4 summarizes the allowed states of the switches Q1-Q4 in response to the control signals of the controller 14. Hereafter, the terms 'set' and 'clear' will be used to indicate that a signal has been pulled logically high and low respectively.

The controller 14 includes a number of peripherals 17 that are configured as a current limiter 20. The current limiter 20 is responsible for monitoring current in the phase winding 7 and generating an overcurrent signal in the event that the current exceeds a threshold.

Figure 5:
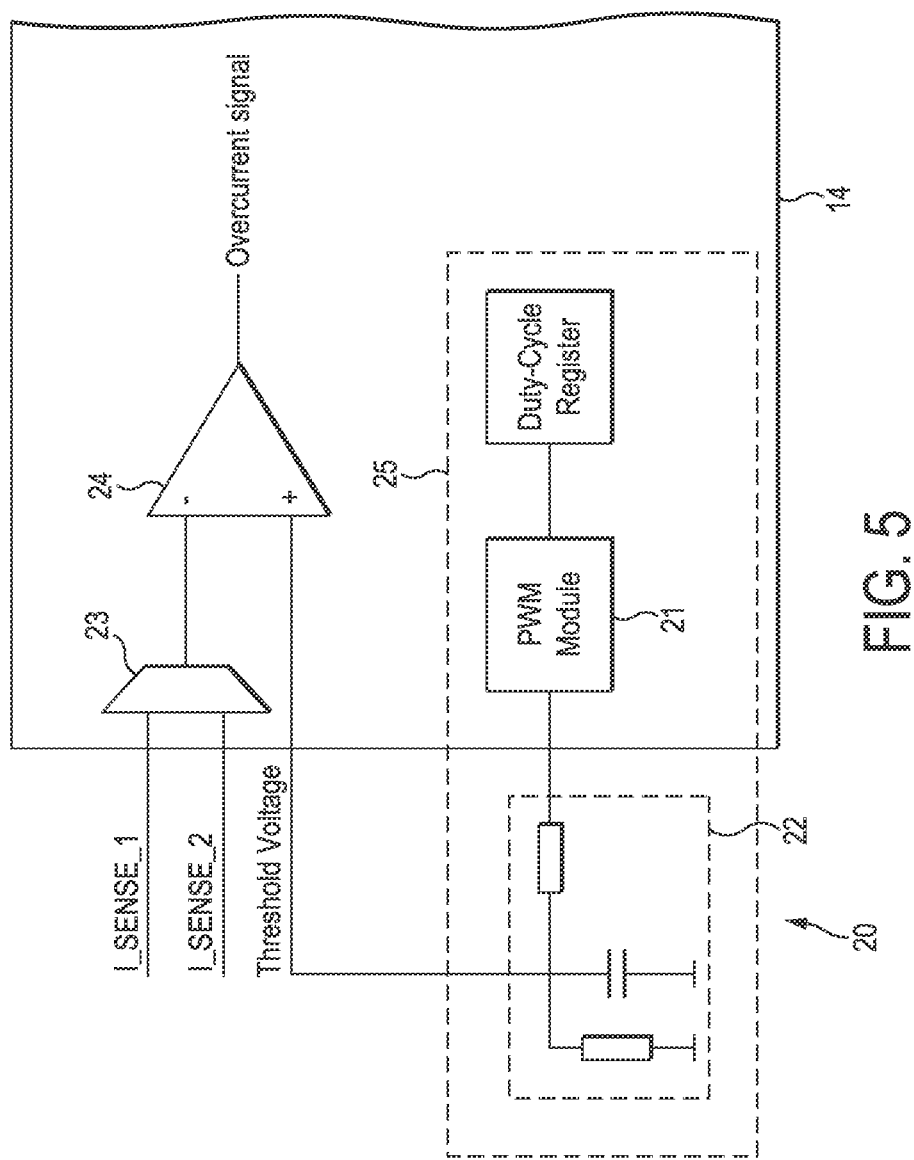
FIG. 5 illustrates a schematic diagram of the current limiter of the motor system.

As illustrated in FIG. 5, the current limiter 20 comprises a PWM module 21, a smoothing filter 22, a multiplexer 23 and a comparator 24. The PWM module 21, the multiplexer 23 and the comparator 24 form part of the peripherals 17 of the controller 14. The smoothing filter 22, on the other hand, is located external of the controller 14.

The PWM module 21 and the smoothing filter 22 may collectively be regarded as a threshold generator 25, which generates a threshold signal having a particular voltage. The PWM module 21 generates a pulsed voltage signal, which is output by the controller 14. The smoothing filter 22 smoothes the pulsed voltage signal to generate the threshold signal, which is then input to the controller 14. The PWM module 21 employs a constant period and a variable duty cycle that is set by the processor 15.

Accordingly, the voltage of the threshold signal depends on the duty cycle set by the processor 15.

The multiplexer 23 has two inputs for selecting one of the two current-sense signals, I_SENSE_1 and I_SENSE_2. The selection made by the multiplexer 23 is controlled by the processor 15 in response to the direction of current through the phase winding 7. Consequently, when DIR1 is set, the multiplexer 23 selects I_SENSE_1, and when DIR2 is set, the multiplexer 23 selects I_SENSE_2. The output of the multiplexer 23 is delivered to the comparator 24.

The comparator 24 compares the voltage of the current-sense signal, I_SENSE_1 or I_SENSE_2, with the voltage of the threshold signal. When the voltage of the current-sense signal exceeds that of the threshold signal, the comparator 24 outputs an overcurrent signal that is pulled logically low. Otherwise, the comparator 24 outputs an overcurrent signal that is pulled logically high.

The current limiter 20 therefore toggles the overcurrent signal when the voltage of the current-sense signal exceeds that of the threshold signal. Since the voltage of the current-sense signal is directly proportional to the current in the phase winding 7, the current limiter 20 toggles the overcurrent signal when current in the phase winding 7 exceeds an overcurrent threshold. The overcurrent threshold is defined by the duty cycle of the PWM module 21, which is set by the processor 15 of the controller 14. As explained below, the controller 14 is therefore able to employ different overcurrent thresholds according to the voltage of the power supply 2 and/or the speed of the motor 3.

The controller 14 operates in one of two modes depending on the speed of the rotor 5. At speeds below a predetermined speed threshold, the controller 14 operates in acceleration mode. At speeds at or above the speed threshold, the controller 14 operates in steady-state mode. The speed of the rotor 5 is determined from the period, T_HALL, between two successive edges of the HALL signal. This interval will hereafter be referred to as the Hall period.

Acceleration Mode

At speeds below the speed threshold, the controller 14 commutates the phase winding 7 in synchrony with the edges of the HALL signal. Each HALL edge represents a change in the polarity of back EMF in the phase winding 7. Consequently, the controller 14 commutates the phase winding 7 in synchrony with the zero-crossings of back EMF.

Commutation involves reversing DIR1 and DIR2 (i.e. clearing DIR1 and setting DIR2, or clearing DIR2 and setting DIR1) so as to reverse the direction of current through the phase winding 7. The phase winding 7 may be freewheeling at the point of commutation. Accordingly, in addition to reversing DIR1 and DIR2, the controller 14 sets FW# so as to ensure that the inverter 10 is returned to a drive condition.

When current in the phase winding 7 reaches an overcurrent threshold, the current limiter 20 clears the overcurrent signal. In response to the change in overcurrent signal, the controller 14 freewheels the phase winding 7 by clearing FW#. Freewheeling continues for a freewheel period, T_FW, during which time current in the phase winding 7 is expected to decay to a level below the overcurrent threshold. If current in the phase winding 7 continues to exceed the overcurrent threshold (i.e. if the overcurrent signal continues to be clear), the controller 14 again freewheels the phase winding 7 for the freewheel period, T_FW. If, on the other hand, current in the phase winding 7 has dropped below the overcurrent threshold (i.e. the overcurrent signal is set), the controller 14 excites the phase winding 7 by setting FW#. Consequently, the controller 14 sequentially excites and freewheels the phase winding 7.

Figure 6:
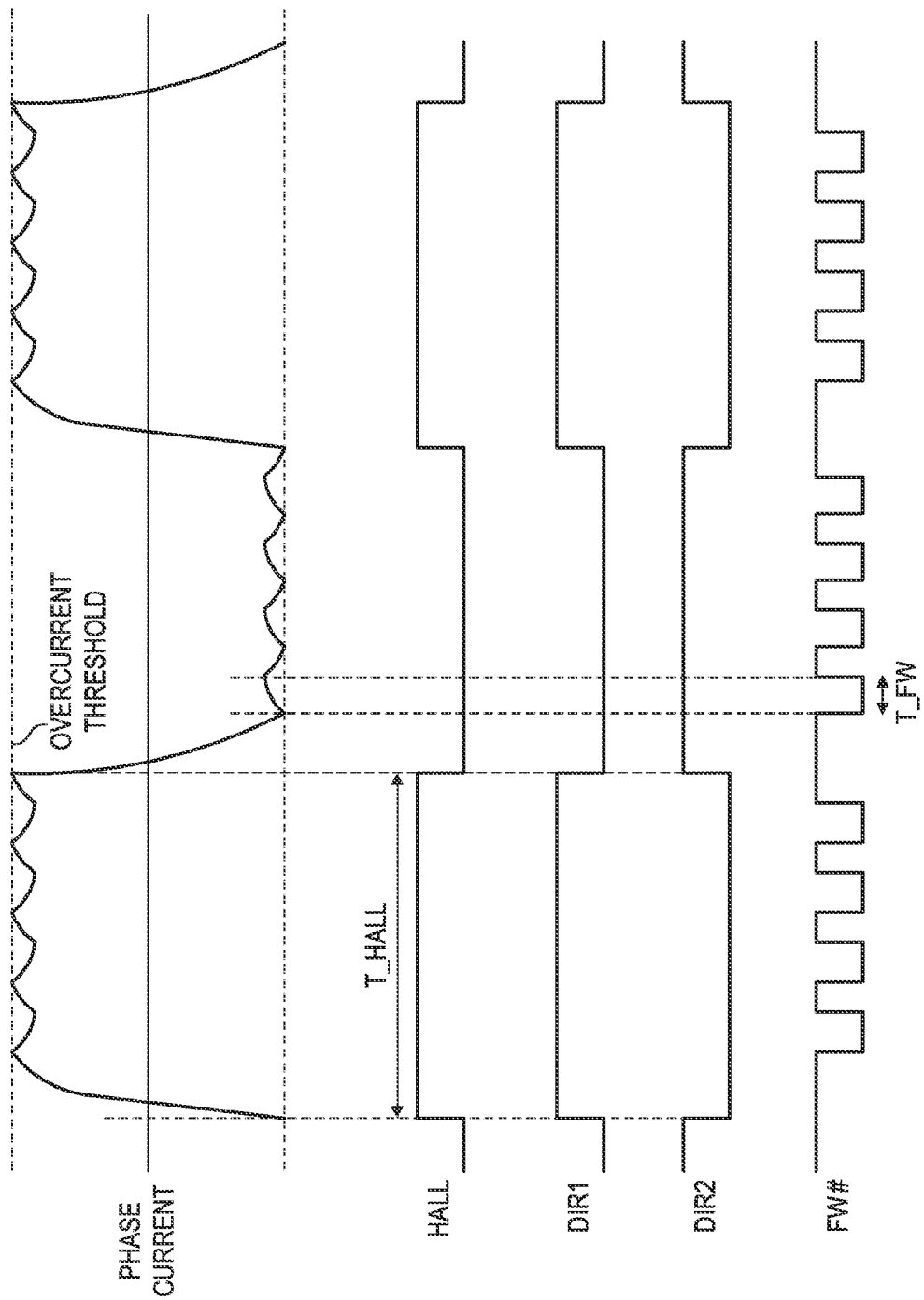
FIG. 6 illustrates various waveforms of the motor system when operating in acceleration mode.

FIG. 6 illustrates the waveforms of the HALL signal, the control signals, and the phase current over a few Hall periods when operating in acceleration mode.

The controller 14 may employ a fixed freewheel period, T_FW. However, for a fixed freewheel period, the corresponding electrical angle increases with rotor speed. Consequently, the remaining electrical angle over which current and thus power is driven into the phase winding 7 decreases. Additionally, as the rotor speed increases, the back EMF induced in the phase winding 7 increases. As a result, phase current decays at a faster rate during freewheeling. Accordingly, rather than employing a fixed freewheel period, the controller 14 instead employs a freewheel period that varies with rotor speed. More particularly, the controller 14 employs a freewheel period that decreases with increasing rotor speed. Additionally, for reasons that are set out below, the controller 14 employs a freewheel period that varies with the voltage of the power supply 2. The controller 14 therefore comprises a freewheel lookup table that stores a freewheel period, T_FW, for each of a plurality of supply voltages and rotor speeds. The controller 14 then periodically updates the freewheel period by indexing the freewheel lookup table using the present voltage of the power supply 2 (as determined from DC_SMOOTH) and the present speed of the rotor 5 (as determined from T_HALL).

The overcurrent threshold employed by the current limiter 20 is not fixed but instead varies with changes in the voltage of the power supply 2 and the speed of the rotor 5. This is achieved by varying the duty cycle of the PWM module 21 in response to changes in DC_SMOOTH and T_HALL. The controller 14 therefore comprises a duty-cycle lookup table that stores a duty cycle for each of a plurality of supply voltages and rotor speeds. The controller 14 then periodically updates the duty cycle of the PWM module 21 by indexing the duty-cycle lookup table using the present voltage of the power supply 2 (as determined from DC_SMOOTH) and the present rotor speed (as determined from T_HALL).

The starting torque of a motor during initial start-up and acceleration may be many orders of magnitude greater than the torque demanded by the load. As a result, the net acceleration torque places considerable stresses on the mechanical components of the motor. The controller 14 therefore employs an overcurrent threshold that increases with rotor speed. As a result, the starting torque and thus the net acceleration torque are reduced. This then reduces the stresses placed on the mechanical components of the motor 3 and thus the lifespan of the motor 3 may be prolonged.

The rate at which current rises in the phase winding 7 depends on, among other things, the voltage of the power supply 2. Consequently, if the same overcurrent threshold is used irrespective of the supply voltage then the input and output power of the motor system 1 may differ with supply voltage. This in turn may adversely affect the acceleration of the motor system 1. Accordingly, the controller 14 employs an overcurrent threshold that increases with decreasing supply voltage. As a result, the same or similar acceleration profile may be achieved irrespective of the voltage of the power supply 2.

Owing to the magnitude of the currents that the power switches Q1-Q4 must carry, as well as the relatively high switching frequency, the power switches Q1-Q4 can become very hot during operation. In order to prevent thermal damage, the motor 2 may include a fan or impeller mounted to the rotor 5 for drawing cooling air through the motor system 1 so as to cool the power switches Q1-Q4. This then enables the power switches Q1-Q4 to carry higher currents than might otherwise be possible. During initial start-up and acceleration, the rotor speed is relatively low and thus very little cooling air is drawn through the motor system 1. By employing an overcurrent threshold that increases with rotor speed, the currents carried by the power switches Q1-Q4 can be kept relatively low at low rotor speeds. This then prevents the power switches Q1-Q4 from overheating at a time where there is little cooling air.

Steady-State Mode

At speeds at or above the speed threshold, the controller 14 commutates the phase winding 7 in advance of each HALL edge, and thus in advance of zero-crossings of back EMF. Again, commutation involves reversing DIR1 and DIR2 and setting FW#.

The controller 14 commutates the phase winding 7 in advance of each HALL edge by an advance period, T_ADV. In order to commutate the phase winding 7 in advance of a particular HALL edge, the controller 14 acts in response to the preceding HALL edge. In response to the preceding HALL edge, the controller 14 subtracts the advance period, T_ADV, from the Hall period, T_HALL, in order to obtain a commutation period, T_COM:

$$T\_COM = T\_HALL - T\_ADV$$

The controller 14 then commutates the phase winding 7 at a time, T_COM, after the preceding HALL edge. As a result, the controller 14 commutates the phase winding 7 in advance of the subsequent HALL edge.

As in acceleration mode, the controller 14 freewheels the phase winding 7 whenever current in the phase winding 7 exceeds an overcurrent threshold. Freewheeling continues for a freewheel period, T_FW, during which time current in the phase winding 7 is expected to decay to a level below the overcurrent threshold. If current in the phase winding 7 continues to exceed the overcurrent threshold, the controller 14 again freewheels the phase winding 7. Otherwise, the controller 14 excites the phase winding 7. Consequently, as in acceleration mode, the controller 14 sequentially excites and freewheels the phase winding 7.

When operating in acceleration mode, the controller 14 sequentially excites and freewheels the phase winding 7 over the full length of each electrical half-cycle. In contrast, when operating in steady-state mode, the controller 14 sequentially excites and freewheels the phase winding 7 over a conduction period, T_CD, that typically spans only part of each electrical half-cycle. At the end of the conduction period, the controller 14 freewheels the winding by clearing FW#. Freewheeling then continues indefinitely until such time as the controller 14 commutates the motor 3.

Figure 7:
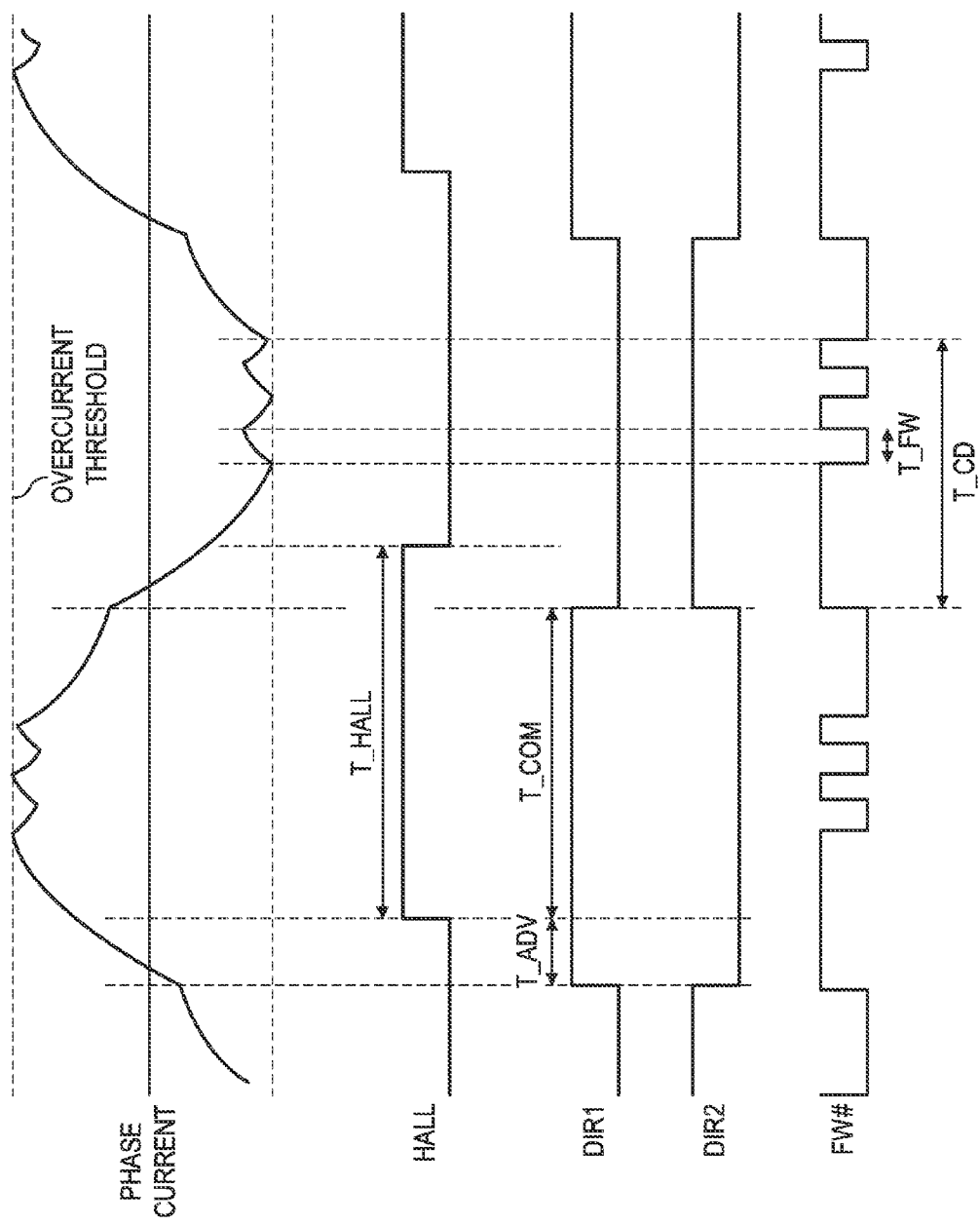
FIG. 7 illustrates various waveforms of the motor system when operating in steady-state mode.

FIG. 7 illustrates the waveforms of the HALL signal, the control signals, and the phase current over a few Hall periods when operating in steady-state mode.

The controller 14 adjusts the advance period, T_ADV, the conduction period, T_CD, the freewheel period, T_FW, and the overcurrent threshold (i.e. the duty cycle of the PWM module 21) in response to changes in the voltage of the power supply 2 and the speed of the rotor 5. The controller 14 therefore stores an advance lookup table and a conduction lookup table in addition to the freewheel and duty-cycle lookup tables. The advance lookup table stores an advance period, T_ADV, for each of a plurality of supply voltages and rotor speeds. Likewise, the conduction lookup table stores a conduction period, T_CD, for each of a plurality of supply voltage and rotor speeds.

The controller 14 periodically updates the advance period, the conduction period, the freewheel period and the duty cycle in response to changes in the voltage of the power supply 2 (as determined from DC_SMOOTH) and the rotor speed (as determined from T_HALL). For example, the controller 14 may update the various control parameters in response to each or every nth HALL edge. Alternatively, the controller 14 may update the control parameters after a fixed period of time or in response to zero-crossings in the voltage of the power supply 2.

The lookup tables store values that achieve a particular input or output power at each voltage and speed point. Moreover, the values are chosen such that the efficiency of the motor system 1 at each voltage and speed point is optimized for the particular input or output power. That is to say that various sets of values for the advance period, the conduction period, the freewheel period and the duty cycle may result in the same desired input or output power. However, from these various sets of values, a single set is selected that provides the optimal efficiency.

The efficiency of a motor system is at a maximum when the waveform of the phase current has the same shape and phase as the waveform of the back EMF. This is because harmonics in the phase-current waveform generate power losses for comparatively little useful output power. By employing an overcurrent threshold that varies with supply voltage and rotor speed, a phase-current waveform having reduced harmonics is achievable, as will now be demonstrated.

Figure 8:
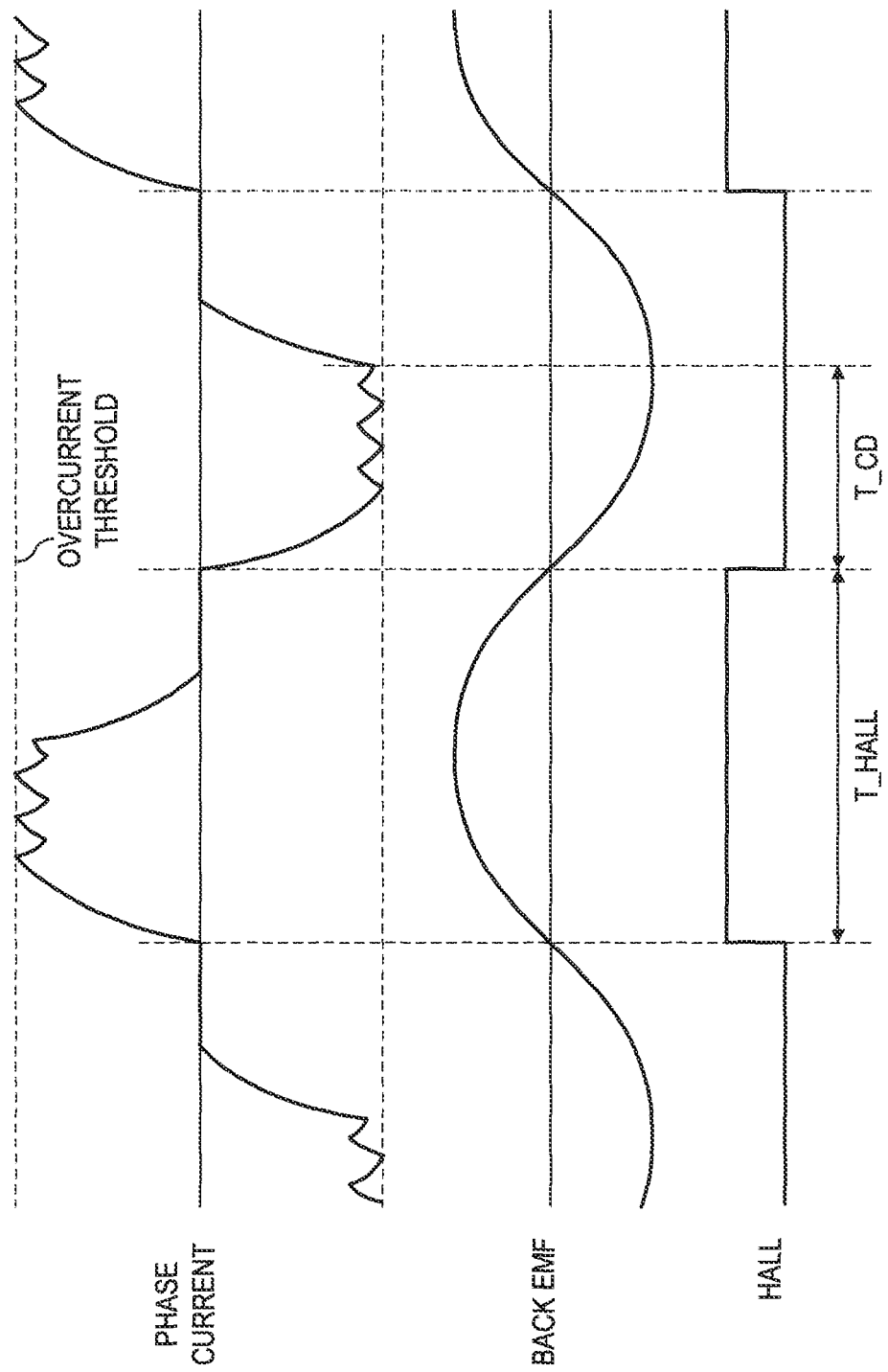
FIG. 8 illustrates various waveforms of the motor system when employing a relatively high overcurrent threshold.

Let us assume that the motor system 1 employs a fixed overcurrent threshold. Moreover, let us assume that the overcurrent threshold is set relatively high and is intended only to prevent excessive currents from damaging electrical components of the control system 4. When operating at a relatively low speed, the back EMF induced in the phase winding 7 is relatively small. As a result, current rises relatively quickly in the phase winding 7 upon excitation. Since current rises relatively quickly and the overcurrent threshold is relatively high, the controller 14 need only employ a short conduction period in order to achieve a particular input or output power. FIG. 8 illustrates the waveforms of the back EMF and the phase current over a few Hall periods. It can be seen that the waveform of the phase current has a relatively high harmonic content.

Figure 9:
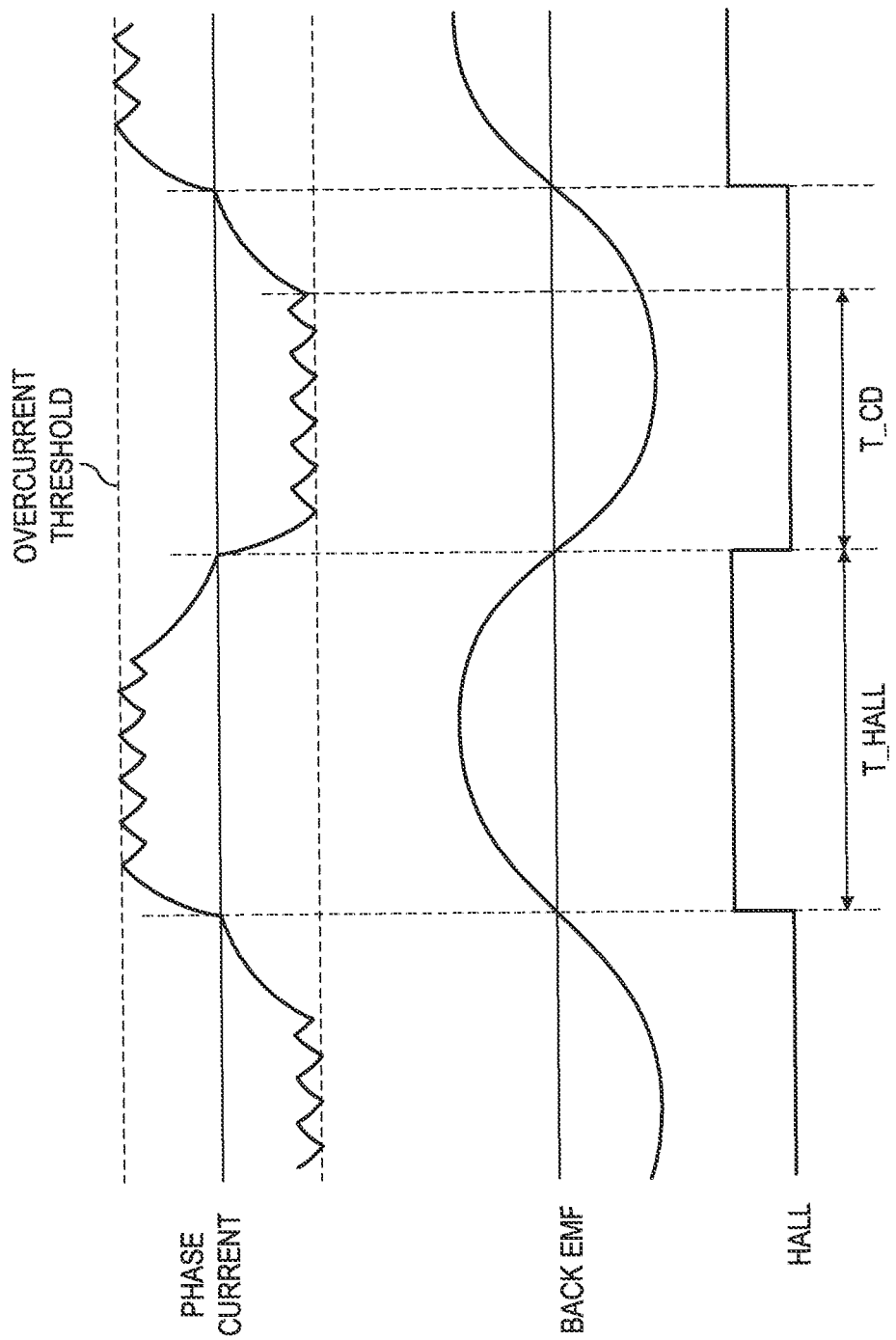
FIG. 9 illustrates various waveforms of the motor system when employing a relatively low overcurrent threshold.

Now let us assume that the motor system 1 employs a lower overcurrent threshold. The motor system 1 is operating at the same relatively low speed and thus the current again rises relatively quickly. However, since the overcurrent threshold is now lower, the controller 14 must employ a longer conduction period in order to achieve the same input or output power. FIG. 9 illustrates the waveforms of the back EMF and the phase current over a few Hall periods. In comparison to that illustrated in FIG. 8, the waveform of the phase current more closely resembles that of the back EMF. The phase current therefore has a smaller harmonic content and thus the efficiency of the motor system 1 is improved. Additionally, since the phase current is limited at a lower threshold, copper losses are reduced, thereby further increasing the efficiency.

The overcurrent threshold, the conduction period, the advance period and the freewheel period all influence the shape of the phase-current waveform. The particular values that result in minimal harmonics within the phase-current waveform will depend on, among other things, the rate at which phase current rises during excitation and decays during freewheeling. The rate at which phase current rises depends on, primarily, the inductance of the phase winding 7, the voltage of the power supply 2 and the back EMF in the phase winding 7, which in turn depends on the speed of the rotor 5. It is for this reason that the controller 14 adjusts the overcurrent threshold, the conduction period and the advance period in response to changes in both the supply voltage and the rotor speed. The rate at which current in the phase winding 7 decays during freewheeling depends on, primarily, the inductance and the back EMF. Consequently, the rate of decay depends on the rotor speed but not on the supply voltage. Nevertheless, the voltage of the power supply 2 may influence the freewheel period that results in optimal efficiency. For example, if the voltage of the power supply 2 decreases, phase current will rise at a slower rate during excitation. To compensate for this, a shorter freewheel period may be employed so that phase-current decay during freewheeling is reduced. Conversely, if the voltage of the power supply 2 increases, a longer freewheel period may be employed so as to reduce the frequency of inverter switching over the conduction period. As a result, switching losses may be reduced. Accordingly, the controller 14 also adjusts the freewheel period in response to changes in the supply voltage and the rotor speed.

By employing an overcurrent threshold that varies with supply voltage and/or rotor speed, improvements in efficiency of between 5% and 10% have been observed in comparison to a motor system that employs a fixed overcurrent threshold.

Although the controller 14 adjusts the overcurrent threshold in response to changes in supply voltage and/or rotor speed when operating in both acceleration mode and steady-state mode, the reasons for doing so are very different for the two operating modes. In acceleration mode, the controller 14 adjusts the overcurrent threshold so as to reduce starting torque and/or to prevent overheating of the power switches Q1-Q4. In steady-state mode, the controller 14 adjusts the overcurrent threshold so as to improve the efficiency of the motor system 1.

In the embodiment described above, the controller 14 commutates the phase winding 7 in advance of each HALL edge when operating in steady-state mode. The reason for this is that, as the rotor speed increases, the Hall period decreases and thus the time constant (L/R) associated with the phase winding inductance becomes increasingly important. By commutating the phase winding 7 in advance of each HALL edge, the supply voltage is boosted by the back EMF. As a result, the direction of current through the phase winding 7 may be more quickly reversed. Additionally, as the rotor speed increases, so too does the back EMF induced in the phase winding 7, which in turn influences the rate at which phase current rises. By commutating the phase winding 7 in advance of each HALL edge, the phase current may be caused to lead the back EMF, which then helps to compensate for the slower rise. Although this then generates a short period of negative torque, this is normally more than compensated by the subsequent gain in positive torque. Moreover, although having a phase-current waveform that leads the back EMF is not ideal in terms of efficiency, it may be necessary in order to achieve a particular input or output power. The controller 14 therefore advances commutation when operating in steady-state mode owing to the relatively high rotor speeds that are involved. However, if the motor system 1 were to operate at lower speeds within steady-state mode, it may not be necessary to advance commutation. Moreover, optimum efficiency for the motor system 1 may be achieved by delaying commutation until after the next HALL edge. Accordingly, when operating in steady-state mode, the controller 14 may advance, synchronize or delay commutation relative to the HALL edges. Therefore, in a more general sense, the controller 14 may be said to adjust the commutation period in response to changes in the supply voltage and the rotor speed.

Rather than storing a lookup table of advance periods, the controller 14 might alternatively store a lookup table of commutation periods. This then enables commutation to occur before (i.e. advanced), at (synchronous), or after (delayed) a HALL edge. For example, the Hall period at 40 krpm is 375 µs. The controller 14 might then store a commutation period of 350 µs in order to commutate the phase winding 7 in advance of the next HALL edge, 375 µs in order to commutate the phase winding 7 in synchrony with the next HALL edge, or 390 µs in order to delay commutation until after the next HALL edge. Additionally, by storing commutation periods rather than advance periods, the controller 14 no longer needs to subtract the advance period, T_ADV, from the Hall period, T_HALL, in order to obtain the commutation period, T_COM. As a result, a simpler and potentially cheaper microcontroller might be used.

The advance/commutation period and the conduction period define the electrical angles at which phase excitation begins and ends. Accordingly, in a more general sense, the controller 14 may be said to sequentially excite and freewheel the phase winding over a period defined between a turn-on angle and a turn-off angle. The controller 14 then adjusts the overcurrent threshold, the turn-on angle and/or the turn-off angle in response to changes in the supply voltage and the rotor speed.

Each lookup table stores values that can be directly loaded into timers of the controller 14. This then simplifies the instructions executed by the controller 14 and thus a relatively simple and cheap microcontroller may be used. However, the controller 14 might store alternative values for controlling the excitation and freewheeling of the phase winding 7. For example, the lookup tables might store electrical angles (e.g. turn-on, turn-off and freewheel angles). Alternatively, the behaviour of each control parameter with supply voltage and rotor speed may be represented by an equation. The controller 14 then solves the equation using the present supply voltage and rotor speed in order to obtain the value of the control parameter.

In the embodiment described above, the controller 14 adjusts the various control parameters (i.e. advance period, conduction period, freewheel period, and duty cycle) in response to changes in both supply voltage and rotor speed. However, if the voltage of the power supply 2 is relatively regular, or if variances in the supply voltage are not deemed important, then the various control parameters may be adjusted for rotor speed only. This then reduces the memory requirements of the controller 14. Accordingly, a potentially cheaper controller might be used. Alternatively, the additional memory that is made available may be used to employ a finer speed resolution for the lookup tables.

In the embodiment described above, the motor system 1 is driven by an AC power supply 2. The various control parameters are then updated in response to changes in the RMS voltage of the power supply (as determined from DC_SMOOTH). However, one or more of the control parameters might alternatively be updated in response to changes in the DC link voltage, i.e. without any smoothing. The control parameters are then updated as the DC link voltage varies across the cycle of the AC power supply 2. Rather than an AC power supply, the motor system 1 might also be driven by a DC power supply, such as a battery. By adjusting the control parameters in response to changes in the supply voltage, a particular power profile may then be maintained as the battery discharges. Moreover, the efficiency of the motor system 1 may be optimized at each voltage point, such that battery life is increased.

Although the controller 14 adjusts the freewheel period in response to changes in supply voltage and rotor speed, it is quite possible that a fixed freewheel period may be used, particularly when operating in steady-state mode. For a fixed freewheel period, the corresponding electrical angle increases with rotor speed. The practicalities of using a fixed freewheel period will therefore depend on the speed range of the motor system 1 and the inductance of the phase winding 7. For example, if the speed range is relatively small then the freewheel angle for a fixed freewheel period will be roughly the same at each end of the speed range. Alternatively, if the inductance of the phase winding 7 is relatively high then the phase current will decay at a relatively slow rate during freewheeling. Consequently, even if a fixed freewheel period results in very different freewheel angles at opposite ends of the speed range, the resulting decay in phase current during freewheeling may not be a problem. By employing a fixed freewheel period, additional memory is then made available for the other control parameters, which are generally more critical in shaping the phase-current waveform.

In response to a FW# signal that is pulled logically low, the gate driver module 11 opens both high-side switches Q1,Q2. Current in the phase winding 7 then freewheels around the low-side loop of the inverter 10 in a direction defined by DIR1 and DIR2. Certain types of power switch are able to conduct in both directions. Accordingly, in addition to opening both high-side switches Q1,Q2, the gate driver module 11 may close both low-side switches Q3,Q4. This then enables current in the phase winding 7 to freewheel through both low-side switches Q3,Q4, rather than through a less efficient freewheel diode. Furthermore, rather than freewheeling around the low-side loop of the inverter 10, the gate driver module 11 may instead control the switches Q1-Q4 such that phase-current freewheels around the high-side loop.

By having a pair of shunt resistors R1,R2, each located on a lower arm of the inverter 10, the current sensor 12 is able to sense current in the phase winding 7 during excitation and freewheeling. However, since the controller 14 freewheels the phase winding 7 for a predetermined period of time, it is not essential to monitor the phase current during freewheeling. Accordingly, the current sensor 12 might comprise a single shunt resistor. Although current cannot then be sensed during freewheeling, the use of a single shunt resistor reduces the component cost and the power dissipation of the current sensor 12. Although the reduction in power dissipation may be small, this may nevertheless prove critical for certain applications, e.g. a low power, low voltage motor system.

In the embodiment described above, the current limiter 20 is formed primarily from the peripherals 17 of controller 14. This then reduces the overall cost of the motor system 1 by making use of the available peripherals 17 of the controller 14, where possible. However, the current limiter 20 might equally be provided as separate circuit that then outputs the overcurrent signal to controller 14.

In the embodiment described above, the threshold generator 25 responsible for generating the threshold signal comprises a PWM module 21 and a smoothing filter 22. This then makes use of existing peripherals 17 of the controller 14. However, alternative arrangements for generating the threshold signal might equally be used. By way of example, the peripherals 17 of the controller 14 might comprise a digital-to-analog converter (DAC). However, a microcontroller having a PWM module is generally cheaper than a microcontroller having a DAC. Accordingly, the use of a PWM module offers a cost-effective solution for generating a threshold signal that can be adjusted in response to changes in supply voltage and/or rotor speed.

Although reference has thus far been made to a motor system 1 having a permanent-magnet motor 3, the use of an overcurrent threshold that varies with rotor speed might equally be used to limit the current in the phase windings of other types of electrical machines, including both motors and generators. The electrical machine may comprise more than one phase winding. Additionally, for certain types of electrical machines, the direction of current through a phase winding may be unidirectional. Consequently, commutation does not necessarily involve reversing the direction of current through a phase winding.

The invention claimed is:

1. A method of controlling an electrical machine, the method comprising:
   exciting a phase winding of the electrical machine with a supply voltage;
   freewheeling the phase winding when current in the phase winding exceeds a threshold;
   adjusting the threshold in response to changes in at least one of the supply voltage and the speed of the electrical machine, and
   increasing the threshold in response to at least one of a decrease in the supply voltage and an increase in the speed of the electrical machine.

2. The method of claim 1, wherein the method comprises freewheeling the phase winding for a freewheel period and exciting the phase winding at the end of the freewheel period, and the freewheel period is fixed over each electrical half-cycle.

3. The method of claim 1, wherein the method comprises sequentially exciting and freewheeling the phase winding over a period defined between a turn-on angle and a turn-off angle for each electrical half-cycle, and adjusting at least one of the turn-on angle and the turn-off angle in response to changes in at least one of the supply voltage and the speed of the electrical machine.

4. The method of claim 1, wherein the method comprises sequentially exciting and freewheeling the phase winding over a conduction period for each electrical half-cycle, and adjusting the length of the conduction period in response to changes in at least one of the supply voltage and the speed of the electrical machine.

5. The method of claim 1, wherein the method comprises freewheeling the phase winding for a freewheel period, and adjusting the freewheel period in response to changes in at least one of the supply voltage and the speed of the electrical machine.

6. The method of claim 1, wherein the method comprises:
   generating a pulsed signal having a duty cycle;
   smoothing the pulsed signal to generate a threshold voltage;
   sensing the voltage across a component of the electrical machine;
   comparing the sensed voltage with the threshold voltage;
   freewheeling the phase winding when the sensed voltage exceeds the threshold voltage; and
   adjusting the duty cycle in response to changes in at least one of the supply voltage and the speed of the electrical machine.

7. The method of claim 6, wherein the method comprises storing a lookup table comprising a duty cycle for each of a plurality of voltages or speeds, selecting from the look-up table a duty cycle corresponding to supply voltage or the speed of the electrical machine, and using the selected duty cycle to generate the pulsed signal.

8. A method of controlling an electrical machine, the method comprising:
   sequentially exciting and freewheeling a phase winding of the electrical machine over each electrical half-cycle, the phase winding being excited with a supply voltage, the phase winding being freewheeled for a freewheel period when current in the phase winding exceeds a threshold, and the freewheel period being constant over each electrical half-cycle; and
   adjusting the threshold in response to changes in at least one of the supply voltage and the speed of the electrical machine.

9. A method of controlling an electrical machine, the method comprising:
   exciting a phase winding of the electrical machine with a supply voltage;
   generating a pulsed signal having a duty cycle;
   smoothing the pulsed signal to generate a threshold voltage;
   sensing the voltage across a component of the electrical machine;
   comparing the sensed voltage with the threshold voltage;
   freewheeling the phase winding when the sensed voltage exceeds the threshold voltage; and
   adjusting the duty cycle in response to changes in at least one of the supply voltage and the speed of the electrical machine.

10. The method of claim 9, wherein the method comprises storing a lookup table comprising a duty cycle for each of a plurality of voltages or speeds, selecting from the look-up table a duty cycle corresponding to supply voltage or the speed of the electrical machine, and using the selected duty cycle to generate the pulsed signal.

11. A method of controlling an electrical machine, the method comprising:
   sequentially exciting and freewheeling a phase winding of the electrical machine over a period defined between a turn-on angle and a turn-off angle for each electrical half-cycle, wherein the phase winding is excited with a supply voltage and the phase winding is freewheeled when current in the phase winding exceeds a threshold; and
   adjusting the threshold and at least one of the turn-on angle and the turn-off angle in response to changes in at least one of the supply voltage and the speed of the electrical machine.

12. A control system for an electrical machine, wherein the control system causes the electric machine to perform:
   exciting a phase winding of the electrical machine with a supply voltage;
   freewheeling the phase winding when current in the phase winding exceeds a threshold;
   adjusting the threshold in response to changes in at least one of the supply voltage and the speed of the electrical machine, and
   increasing the threshold in response to at least one of a decrease in the supply voltage and an increase in the speed of the electrical machine.

13. The control system of claim 12, wherein the control system comprises:
   an inverter coupled to the phase winding;
   a current sensor for sensing current in the phase winding; and
   a controller for generating one or more control signals for controlling the inverter,
   wherein the inverter excites the phase winding with the supply voltage in response to first control signals and freewheels the winding in response to second control signals, and the controller generates the first control signals and subsequently generates the second control signals when current in the phase winding exceeds the threshold.

14. The control system of claim 12, wherein the current sensor outputs a signal having a voltage that is sensitive to current in the phase winding, the control system comprises a threshold generator that generates a signal having a voltage that depends on at least one of the supply voltage and the speed of the electrical machine, and the controller generates the second control signals when the voltage of the signal output by the current sensor exceeds the voltage of the signal output by the threshold generator.

15. The control system of claim 12, wherein the threshold generator comprises a PWM module and a smoothing filter, and the duty cycle of the PWM module depends on at least one of the supply voltage and the speed of the electrical machine.

16. A motor system comprising a permanent-magnet motor and a control system as claimed in claim 12.

17. A control system for an electrical machine, wherein the control system causes the electric machine to perform:
   sequentially exciting and freewheeling a phase winding of the electrical machine over each electrical half-cycle, the phase winding being excited with a supply voltage, the phase winding being freewheeled for a freewheel period when current in the phase winding exceeds a threshold, and the freewheel period being constant over each electrical half-cycle; and
   adjusting the threshold in response to changes in at least one of the supply voltage and the speed of the electrical machine.

18. A control system for an electrical machine, wherein the control system causes the electric machine to perform:
   exciting a phase winding of the electrical machine with a supply voltage;
   generating a pulsed signal having a duty cycle;
   smoothing the pulsed signal to generate a threshold voltage;
   sensing the voltage across a component of the electrical machine;
   comparing the sensed voltage with the threshold voltage;
   freewheeling the phase winding when the sensed voltage exceeds the threshold voltage; and
   adjusting the duty cycle in response to changes in at least one of the supply voltage and the speed of the electrical machine.

19. A control system for an electrical machine, wherein the control system causes the electric machine to perform:
   sequentially exciting and freewheeling a phase winding of the electrical machine over a period defined between a turn-on angle and a turn-off angle for each electrical half-cycle, wherein the phase winding is excited with a supply voltage and the phase winding is freewheeled when current in the phase winding exceeds a threshold; and
   adjusting the threshold and at least one of the turn-on angle and the turn-off angle in response to changes in at least one of the supply voltage and the speed of the electrical machine.

\* \* \* \* \*